United States Patent [19]

Drexler

[11] Patent Number: 4,570,252
[45] Date of Patent: Feb. 11, 1986

[54] OPTICAL DATA RETRIEVAL SYSTEM USING MULTI-SPECTRAL LIGHT SOURCES

[75] Inventor: Jerome Drexler, Los Altos Hills, Calif.

[73] Assignee: Drexler Technology Corporation, Mountain View, Calif.

[21] Appl. No.: 483,808

[22] Filed: Apr. 11, 1983

Related U.S. Application Data

[63] Continuation-in-part of Ser. No. 406,719, Aug. 9, 1982, abandoned.

[51] Int. Cl.$^4$ .............................................. G11B 7/00
[52] U.S. Cl. .................................... 369/109; 369/100; 369/58; 250/578; 365/120
[58] Field of Search ................. 369/100, 109, 111, 59, 369/54, 58, 120, 121, 122; 365/120, 124, 127; 250/569, 570, 578

[56] References Cited

U.S. PATENT DOCUMENTS

| | | | |
|---|---|---|---|
| 3,610,722 | 10/1971 | Bestenreiner | 369/94 |
| 3,636,526 | 1/1972 | Feinleib | 365/120 |
| 3,898,629 | 8/1975 | Westerberg | 365/127 |
| 3,919,447 | 11/1975 | Kilmer | 350/316 |
| 3,919,698 | 11/1975 | Bricot | 369/110 |
| 4,012,587 | 3/1977 | Ochi | 250/578 |
| 4,145,758 | 3/1979 | Drexler | 365/127 |
| 4,161,752 | 7/1979 | Basilico | 365/124 |
| 4,163,600 | 8/1979 | Russell | 369/59 |
| 4,269,917 | 5/1981 | Drexler | 430/16 |
| 4,272,574 | 6/1981 | Lippits | 369/275 |
| 4,304,848 | 12/1981 | Bouldin | 430/401 |
| 4,375,096 | 2/1983 | Gorog | 369/54 |
| 4,477,891 | 10/1984 | Gorog | 369/109 |

*Primary Examiner*—Alan Faber

[57] ABSTRACT

An optical data retrieval system featuring probe beams of different wavelengths directed onto an optically reflective recording medium having different spectral responses to the probe beams. A first probe beam is directed onto the reflective medium in a manner such that the amount of light reflected from the medium may be detected while a second probe beam is directed through the medium in a manner such that the amount of light passing through the medium may be measured. Different amounts for both beams are detected at pits in the medium and in the reflective field surrounding the pits. The redundancy provided by two probe beams eliciting different spectral responses from the medium reduces errors due to dirt and media defects.

25 Claims, 6 Drawing Figures

U.S. Patent  Feb. 11, 1986  Sheet 1 of 2  4,570,252
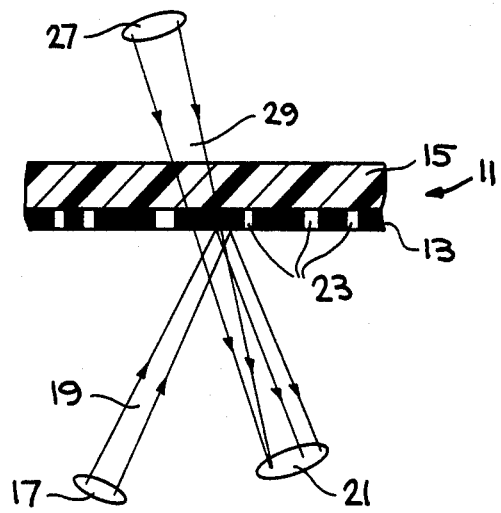
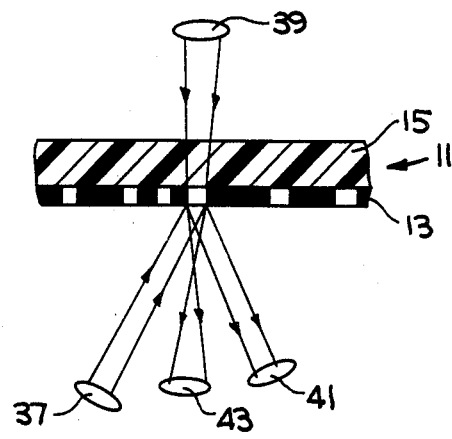
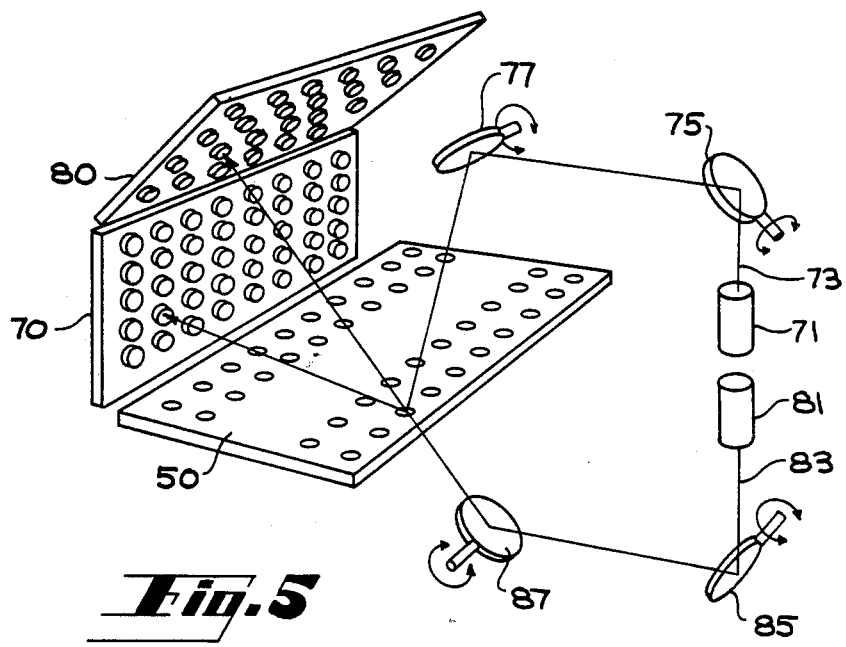
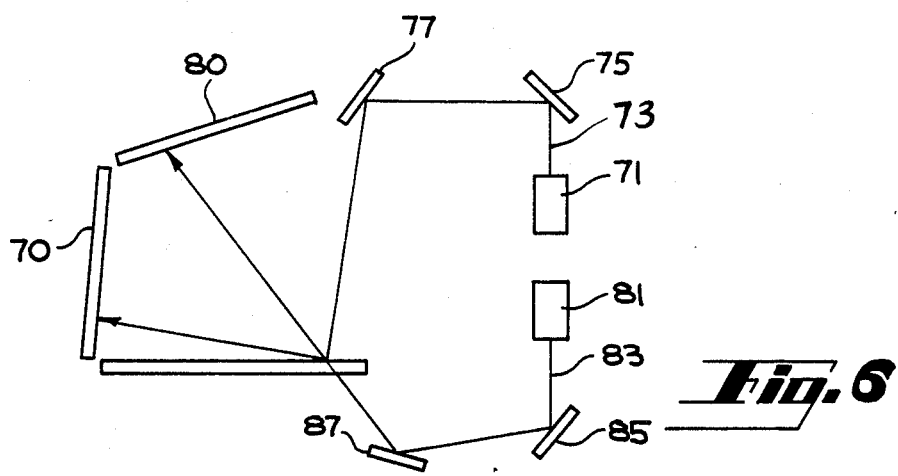

OPTICAL DATA RETRIEVAL SYSTEM USING MULTI-SPECTRAL LIGHT SOURCES

CROSS-REFERENCE TO RELATED APPLICATION

This is a continuation-in-part of application Ser. No. 406,719 filed Aug. 9, 1982, now abandoned.

TECHNICAL FIELD

The invention relates to data recovery from a storage medium, and in particular to recovery of data from an optical storage medium having different optical characteristics for different sources impinging on the medium.

BACKGROUND ART

Optical recording and data storage material having different optical characteristics are known. For example, U.S. Pat. No. 4,269,917 to J. Drexler and E. Bouldin, assigned to the assignee of the present invention, for "Data Storage Medium Having Reflective Particulate Silver Layer," describes a reflective laser recording and data storage medium for direct reading after writing. It is formed from the conversion of a photosensitive silver halide emulsion into a reflective, stable silver-gelatin coated substrate in which the silver-gelatin coating is easily pitted by impingement of a laser beam.

The chemical and physical conversion of the raw silver-halide emulsion material into the laser recording material uses the following exemplary steps. First, a non-saturating actinic radiation exposure is used to activate silver-halide in the form of a fine grain emulsion on a substrate, such as a photoplate, thereby defining areas for data recording. Alternatively, data areas on the surface of the medium may be chemically fogged in a water or alcohol base solution to create a very thin layer of silver precipitating nuclei on the surface. A single step, negative silver diffusion transfer process is used to dissolve the unexposed and undeveloped silver halide, forming silver ion complexes. These complexes are transported by diffusion transfer to the sites of the silver precipitating nuclei where reflective silver particles are formed. The resulting reflective coating has a high concentration of nonfilamentary silver particles at the surface of a low melting temperature colloid matrix. For a typical laser wavelength used in laser data retrieval systems the reflective surface layer and underlayer have a composite reflectivity ranging between 15% and 65%.

Laser writing on this recording material is accomplished by making holes or pits or clear spots, all known as "pits" hereafter, in the reflective surface. A laser beam or focussed light beam is used for reading recorded data. The beam impinges on the recorded pits with greatly reduced specular reflection due to scattering and absorption by the pitted underlayer. The reductions in reflectivity are measured by a detector and converted to electrical impulses corresponding to data.

One of the advantages of this medium is that it also can be photographically prerecorded to make clear or partially opaque spots in a reflective field. Such partially opaque spots are spots which are opaque at some wavelengths and transmissive at other wavelengths. In this sense opaque spots are equivalent to clear spots and are grouped into the classification of "pits" mentioned above. In the first non-saturating exposure step a pattern can be formed by exposure through a mask or scanning light source, which after processing, yields two different surface reflectivities. This pattern resides both in the reflective layer and in the underlayer, below the reflective surface layer, or in laterally adjacent areas.

Another form of optical media having different spectral qualities is disclosed in U.S. Pat. No. 4,304,848. Replication techniques are disclosed for prerecording opaque data spots in a reflective field. An unexposed silver halide emulsion is exposed to actinic radiation through a master disc having clear data spots in an opaque field. The exposed area of the emulsion corresponding to the master's clear data spots is then developed black. Exposure of the surface of the emulsion to chemical fogging and development in a monobath then converts the remaining unexposed silver halide to a reflective silver background. Opaque data spots appear against a reflective field on the prerecorded copy. By use of a master disc having opaque data spots in a clear background it is possible to obtain reflective data spots in an opaque field by the same procedure.

One of the problems which occurs in reading differences in reflected light from the optical media is that it is difficult to distinguish between a change of reflectivity due to the presence of a pit and that due to the presence of dirt particles or material defects which might affect light scattering or absorption. U.S. Pat. No. 3,919,447 to C. C. Kilmer, Jr. et al for "Spectral Diffrential Coded Card" teaches a data card made of two films. The first film has a transmission bandpass in the infrared. The second film is opaque at a single frequency in the first film bandpass. The differences in spectral response allows a beam operating at the single frequency to read data.

U.S. Pat. No. 4,145,758 to J. Drexler and C. Betz, assigned to the assignee of the present invention for "Error Checking Method and Apparatus for Digital Data in Optical Recording Systems" describes a data reading system wherein digital data is written onto a transmissive medium, such as a photoplate, by a modulated laser whose beam is detected by a first photodetector means which measures laser output directed toward the recording medium. A second photodetector means measures light scattering from the medium, while a third photodetector detects and measures light transmitted through the recording layer of the medium surface to confirm recording of the data. Amounts of transmitted light or scattered light from the medium during the recording process are correlated to the laser output into expected values of light for detecting errors in recording immediately after the time of recording. This error detection system is intended for light transmissive media and would not be used in reading reflective media. The defects are detectable by the apparatus before laser recordings themselves are detectable.

An object of the present invention is to read photographically prerecorded data pits in the form of partially opaque or clear spots in a reflective field, or data pits in the form of reflective data spots in a partially opaque or clear field, with a low error rate, reducing the effects of dirt and material defects in the recording medium.

DISCLOSURE OF INVENTION

The above object has been achieved with an optical data retrieval system capable of distinguishing optical data in reflective optical storage disks, optical cards or optical tape. The medium must have a plurality of spectral responses to optical probe beams which are interpreted by simultaneous measurements of specular reflectivity and optical transmissivity. The different optical characteristics are associated with different wavelengths of light from different probe beams. The term "probe beam" means that the beam impinging on the data storage medium does not cause recording of data by creation of pits.

In reflective silver-based recording media of the type described in U.S. Pat. No. 4,304,848 data is prerecorded as either reflective spots against a partially opaque background or partially opaque spots in a reflective background.

In addition, in reflective silver-based recording media of the type described in U.S. Pat. Nos. 4,269,917 and 4,284,716, data may be photographically prerecorded in certain areas prior to formation of the reflective silver, laser recorded pits in other areas. This type of photographically prerecorded data may be black or clear or have a duller silver appearance.

These reflective, opaque and clear areas produced from a silver halide emulsion in accord with methods disclosed in the above patents, U.S. Pat. Nos. 4,269,917, 4,304,848, and 4,284,716, have different spectral characteristics depending upon the impinging light wavelength. Partially opaque or black areas have a high optical density, i.e., low transmissivity, to 1200 nm and low specular reflectivity to 830 nm light. Reflective areas may be highly transmissive to wavelengths of 1200 nm and highly reflective 830 nm light.

The present invention contemplates use of two beam probes, one at a wavelength wherein reflectivity is enhanced, i.e., approximately 830 nanometers, and a second source where transmission through the reflective layer is enhanced, i.e., 1200 nanometers. The same or different detectors may be used to detect the probe beams after impingement on the medium. If the same detector is used, it should observe light from only one beam at a time. For this purpose, the probe beams should be operated in a pulse mode. Use of different sources optimized for reflectivity and transmissivity enhances data readback reliability, especially when small amounts of foreign particulate matter appear on the surface. Such particulate matter may interfere with reflectivity, but has a lesser effect on infrared transmissivity. Error rates from other media defects are reduced. The invention will be understood with reference to the drawings.

BRIEF DESCRIPTION OF THE DRAWINGS

FIG. 1 is a side plan view of a first simplified system employing the present invention.

FIG. 2 is a side plan view of a second simplified system employing the present invention.

FIG. 5 is a perspective plan view showing a data card used with the second system of the present invention.

FIG. 6 is a side view of the apparatus of FIG. 5, showing optical paths.

BEST MODE FOR CARRYING OUT THE INVENTION

Figure 3:
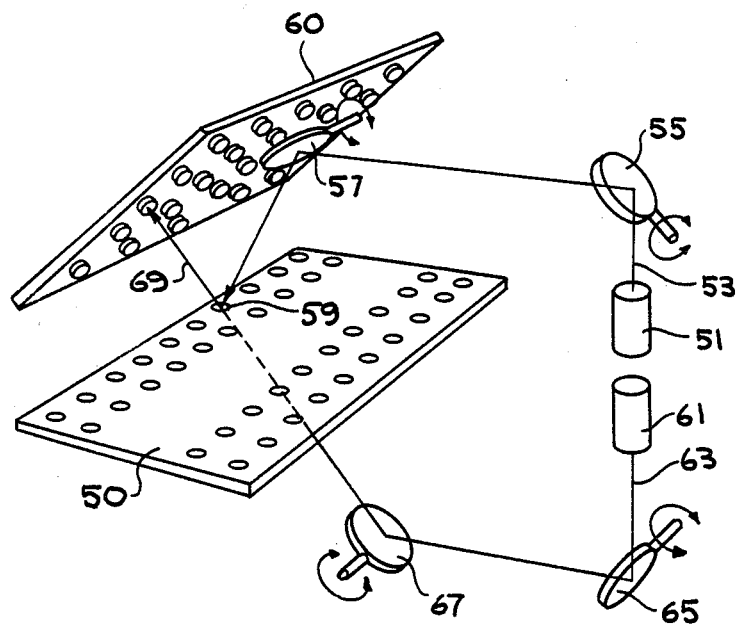
FIG. 3 is a perspective plan view showing a data card used with the first system of the present invention.

With reference to FIG. 1, a laser recording medium, 11, is shown. The preferred medium has a reflective surface, 13, mounted to a generally transparent underlayer, 15. The preferred material is known by the trademark DREXON, exemplified by the article described in U.S. Pat. No. 4,269,917. The article is made from a fine grain silver-halide emulsion by converting the layer 13 from unexposed, undeveloped silver-halide material to a crust containing non-filamentary silver particles forming the reflective surface. The underlayer 15, remains clear, somewhat depleted of silver, but still containing gelatin, as described above. The reflectivity of the reflective layer 13 should exceed 15% and may be as high as 65% for certain wavelengths. The laser recording material is not restricted to the above-mentioned material. Any laser recording material will work which has different spectral responses in transmission and reflection.

With reference to FIG. 1, first beam probe source 17 is preferably a laser, such as a diode laser, having a primary emission at 830 nanometers. The beam 19 is directed toward medium 11 and impinges on reflective layer 13, whereupon a significant fraction of the beam is reflected toward detector 21. The detector is a wideband photo detector, which converts optical signals to electrical signals of corresponding amplitude.

Assuming that the card medium 11 is moved in a horizontal plane, past the beam, pits 23 in the reflective layer, will cause variations in the amount of detected light. A pit will decrease the amount of light reflected from the source 17 to detector 21. This decrease in intensity of detected light signals a data bit. The size of a pit is typically on the order of a few microns, but may be larger or smaller. The beam probes are focussed so that each beam has a size or diameter at the pit approximately the pit diameter, or smaller if possible. Focus is maintained by any automatic focussing mechanism desired. The pits are the desired focal points, although this is not critical so long as the beam size is less than the pit size.

A second means for reading the same pits is derived from a second beam probe source 27 on the opposite side of the card medium 11. This source is again a semiconductor laser. However, in this case, the emission wavelength is different from that of source 17. Preferably, the wavelength for a source intended to pass through the card medium 11 is 1200 nanometers. At this wavelength, over 50% of the amplitude of the beam will pass through the card medium. The beam 29 is aimed at the same detector 21. There will be a substantial increase in transmission when the beam passes through a pit 23, compared to passing through the reflective layer 13. The reflective layer 13 substantially attenuates beam 29. Preferably, the beam sources are operated in a pulse mode and synchronized so that only one source is on at a time. It is possible to operate both sources simultaneously and use polarization or modulation to separate beam components at the detector. It is even possible to simply add both detected beam components without concern for the fractional contribution of each component. However, this may cause ambiguities in interpreting data in the situation where one of the detected beam components presents a weak signal. Separation of the beams, either in time or by modulation, allows the spectral responses of the component beams to be fully evaluated by measurement of beam intensity at the detectors. By means of calibration, it is possible to identify in detector 21 the occurrence of pits in the surface layer 13 of card medium 11.

FIG. 2 shows a similar arrangement as FIG. 1, except that separate detectors are used for each beam. In this configuration, the probe beams may be operated continuously, rather than in a pulse mode as with the apparatus of FIG. 1. The card medium 11 has a reflective layer 13 and a generally transparent underlayer 15. A first beam probe source 37, preferably emitting a beam having a characteristic wavelength centered at 830 nanometers, is directed toward the reflective layer 13, and upon reflection to a first detector 41. Detector 41 is a photodetector, converting the amplitude of detected light signals to corresponding electrical signals. A second light source 39, positioned on the opposite side of the card medium, directs light through the medium toward a second detector 43. Source 39 emits a beam having a characteristic wavelength centered about 1200 nanometers. The beam from source 37, and the beam from source 39, are both focused at the same spot in the reflective layer 13 such that both beams are reading the same spot, just as in FIG. 1. However, the beams are spatially independent at the detectors 41 and 43, so that different detector signals may be obtained. For detector 41, the presence of a pit in the reflective layer 13 will cause a decrease in the output signal, due to less reflected light being received at the detector from source 37. On the other hand, the signal received at detector 43, will increase, since the presence of a pit will allow the infrared beam from source 39 to more easily penetrate the reflective layer 13. The signals from the two detectors may be electrically combined, through logic circuits, for reading data encoded in the reflective layer 13. Preferably, sources 37 and 39 are diode lasers. Detectors 41 and 43 are common photodetectors.

The configuration of FIG. 1 and FIG. 2 relate to a movable card passing fixed optical components. On the other hand, the apparatus of FIGS. 3 and 4 contemplate a stationary card, with scanning beams. A first laser beam probe source 51 directs a beam 53 toward two scanning mirrors 55 and 57, such that the beam 53 may impinge on card medium 50 at a spot 59. Source 51 has a wavelength of approximately 830 nanometers, such that a significant component of the beam will be reflected from a reflective layer of card medium 50, which is constructed in accord with the card illustrated and described with reference to FIG. 1. A detector array, 60, such as a CCD array, has a number of photodiodes integrated into rows and columns, corresponding in number to rows and columns of positions where data would be written in card medium 50. The photodiodes are greatly magnified in the figure. Detector array 60 is maintained at an angle to capture reflected light from card medium 50. Reflected light from card medium 50 is correlated with detector locations in the detector arrays. The second laser beam probe source, 61, directs a beam 63 at mirrors 65 and 67, both of which allow the beam to scan the underside of card medium 50. The mirrors direct the beam to a spot 59 in the reflective layer of card medium 50 such that the beam 63 impinges on the card at the same point as the first beam 53. However, beam 63 is an infrared beam having a wavelength of approximately 1200 nanometers and penetrates the card medium at spot 59. The beam travels onto the same detector location 68 in the detector array 60 as beam 53. The mirrors 65 and 67 are positioned in symmetrically complimentary positions on the underside of the card such that beam 63 is a mirror image of beam 53. By maintaining this mirror-image relationship, a composite beam, 69, will be formed with a component from each of the two sources, 51 and 61. It may be determined when the combined beams represent a pit and when the combined beams represent the absence of a pit. It may be necessary to move detector array 60, in order to read all locations on card medium 50. For example, when the beam is scanning the opposite edge of the card, detector array 60 may not be in the proper position for intercepting beam 69. In this instance, the detector array 60 would be moved to a position for intercepting the beam at a detector position corresponding to data positions in the card medium 50.

Figure 4:
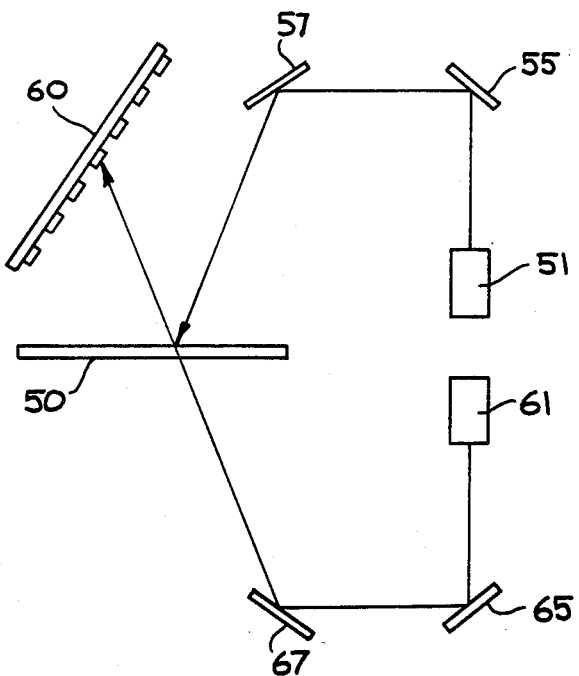
FIG. 4 is a side view of the apparatus of FIG. 3, showing optical paths.

With reference to FIGS. 5 and 6, an alternate embodiment of the construction of FIGS. 3 and 4 may be seen, utilizing two detector arrays. As in FIG. 3, a pair of beam probe sources, 71 and 81, are used, but not necessarily in mirror image relationship with respect to card medium 50. The optical scanning mirrors 75 and 77, for source 71, and mirrors 85 and 87, for source 81, are aligned for directing the two beams, 73 and 83, onto respective CCD arrays 70 and 80. The detector array 70 is positioned to intercept light reflected from the beam probe source 71, while the detector array 80 is positioned to intercept light transmitted through the card from beam probe source 81. Once again, the arrays are both CCD arrays, having a size and number of array elements such that one element corresponds to a data position on card medium 50. For each detector cell in detector array 70, there is a corresponding cell in detector array 80. Corresponding outputs from corresponding detector cells are electrically connected, in the same manner as the outputs of detectors 41 and 43 are combined in FIG. 2. The combined outputs from the two arrays are used to provide redundancy in reading data on the card medium 50, and reducing errors.

I claim:

1. An optical data medium reading system comprising, a transparent substrate carrying a reflective information layer encoding data by means of pits in a reflective field, the medium being transmissive through the pits to a probe beam of a first wavelength, the medium having different reflectivity from the field than from the pits to a probe beam of a second wavelength, and detector means positioned to receive said first and second wavelengths after impingement with the information layer for converting said wavelengths to electrical signals.

2. An optical data card reading system comprising, a data card having an optical data recording medium with a selectively reflective surface layer overlying a transparent substrate, and data being encoded by pits in the reflective surface layer, a first probe beam source positioned on one side of the medium for directing a first beam to impinge on pits in the medium, said first beam having a first characteristic wavelength which is reflected from the surface layer, a second probe beam source positioned on the opposite side of the medium from the first light source for directing a second beam through said substrate and said same pits as the first beam, said second beam having a second characteristic wavelength, beam detector means for intercepting the first and second beams after impingement with the pits and for converting said beams into corresponding electrical signals.

3. The system of claim 2 wherein said first and second sources are disposed on opposite sides of said card in mirror image relation.

4. The system of claim 2 wherein said first characteristic wavelength is 830 nanometers.

5. The system of claim 2 wherein said second characteristic wavelength is 1200 nanometers.

6. The system of claim 2 further defined by first and second scanning mirror means disposed to reflect light from said first and second sources for directing said first and second beams onto said pits and wherein said beam detector means comprises a CCD array.

7. An optical data retrieval system comprising,
an optical data storage medium having a transparent substrate carrying a reflective information layer encoding data by differences in reflectivity between recorded data pits and the surrounding field, the higher reflective areas having high optical reflectivity to a probe beam of a first wavelength and high optical transmissivity to a probe beam of a second wavelength and the lower reflective areas having low optical reflectivity to the probe beam of the first wavelength and low optical transmissivity to the probe beam of the second wavelength,
a first probe beam source positioned on one side of the medium to direct a first wavelength at pits on the reflective information layer of the medium,
a second probe beam source positioned on the opposite side of the medium from the first light source to direct a second wavelength through the medium to the same pits on the information layer as the first light source, and
detector means positioned to receive said first and second wavelengths after impingement with the information layer for converting said wavelengths to electrical signals.

8. The optical data retrieval system of claim 7 wherein said optical data medium has high reflectivity recorded data pits and a low transmissivity surrounding field.

9. The optical data retrieval system of claim 7 wherein said optical data medium has low reflectivity data pits and a high reflectivity surrounding field.

10. The optical data retrieval system of claim 7 wherein said first wavelength is approximately 830 nm.

11. The optical data retrieval system of claim 7 wherein said second wavelength is approximately 1200 nm.

12. The optical data retrieval system of claim 7 wherein light of the first and second wavelengths impinge on the same pits on the medium simultaneously.

13. The optical data retrieval system of claim 7 wherein light of the first and second wavelengths alternately impinge on the same pits on the medium.

14. The optical data retrieval system of claim 7 wherein said detector means comprises separate detectors for each wavelength.

15. The optical data retrieval system of claim 7 wherein said detector means comprises a common detector for both wavelengths.

16. The optical data retrieval system of claim 7 wherein said optical data medium is a data card having a transparent substrate and carrying a reflective recording area in which data is recorded by pits in the reflective area.

17. The optical data retrieval system of claim 7 wherein said optical data medium is a data card having a transparent substrate and carrying a reflective recording area on which reflective data pits have been prerecorded.

18. An optical data retrieval system comprising,
an optical data storage medium having a transparent substrate carrying a reflective information layer encoding data by differences in reflectivity between recorded data pits and the surrounding field, the higher reflective areas having high optical reflectivity to a probe beam of a first wavelength and optical transmissivity to a probe beam of a second wavelength and the lower reflective areas having low optical reflectivity to the probe beam of the first wavelength and higher optical transmissivity to the probe beam of the second wavelength.
a first probe beam source positioned on one side of the medium to direct a first wavelength at pits on the reflective information layer of the medium,
a second probe beam source positioned on the opposite side of the medium from the first light source to direct a second wavelength through the medium to the same pits on the information layer as the first light source, and
detector means positioned to receive said first and second wavelengths after impingement with the information layer for converting said wavelengths to electrical signals.

19. The optical data retrieval system of claim 18 wherein said optical data medium has low reflectivity and high transmissivity recorded data pits.

20. The optical data retrieval system of claim 18 wherein said optical data medium has high reflectivity data pits and a low reflectivity surrounding field.

21. The optical data retrieval system of claim 18 wherein light of the first and second wavelengths impinge on the same pits on the medium simultaneously.

22. The optical data retrieval system of claim 18 wherein light of the first and second wavelengths alternately impinge on the same pits on the medium.

23. The optical data retrieval system of claim 18 wherein said detector means comprises separate detectors for each wavelength.

24. The optical data retrieval system of claim 18 wherein said detector means comprises a common detector for both wavelengths.

25. The optical data retrieval system of claim 18 wherein said optical data medium is a data card having a transparent substrate and carrying a reflective recording area in which lower reflectivity data pits have been prerecorded.

* * * * *